Patented Jan. 27, 1931

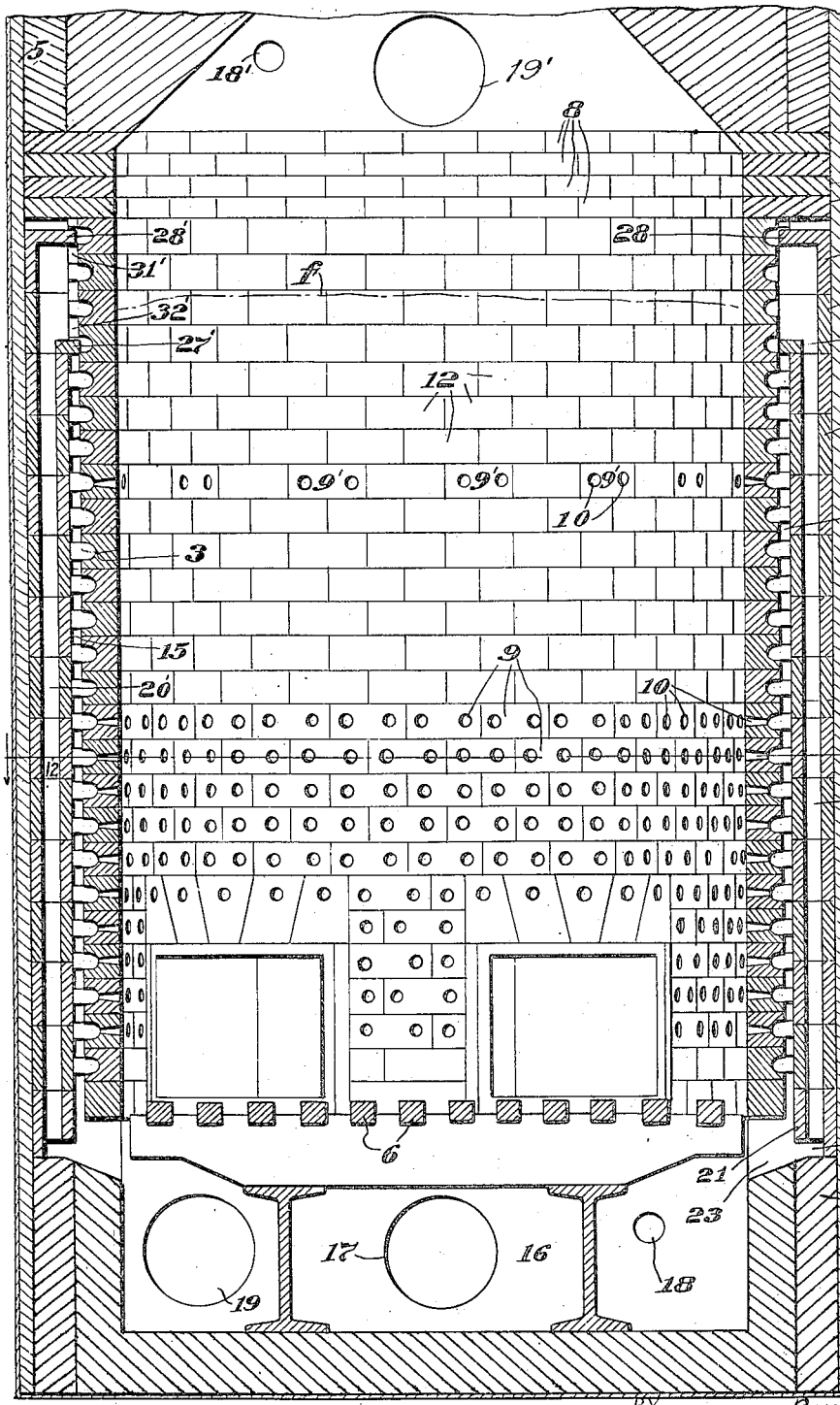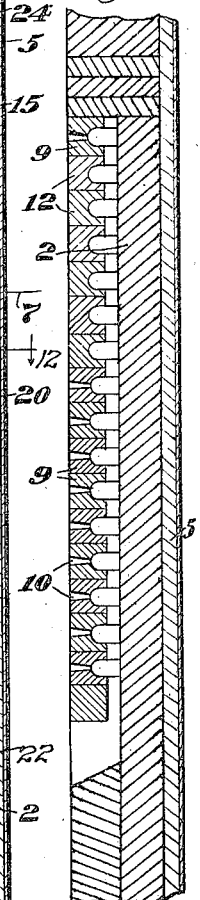

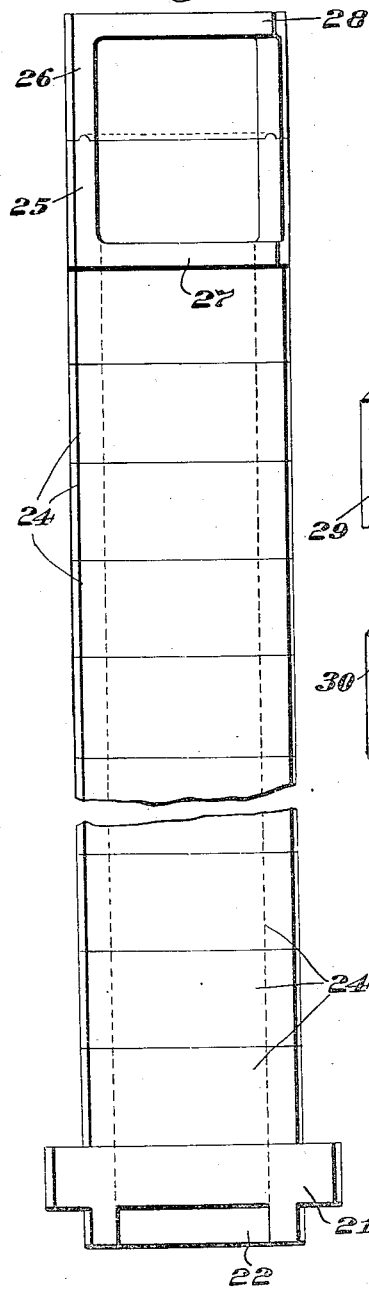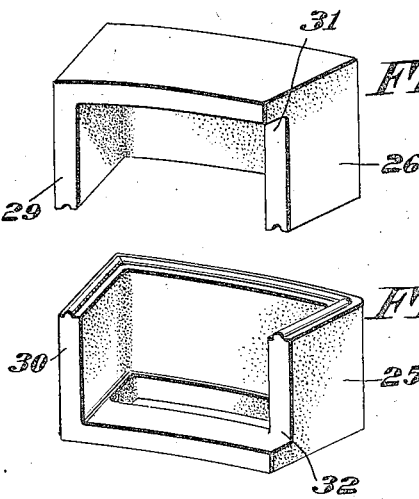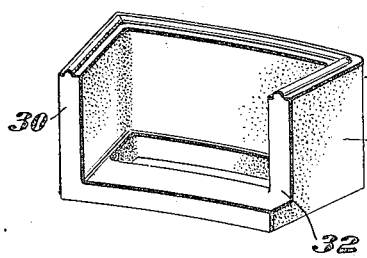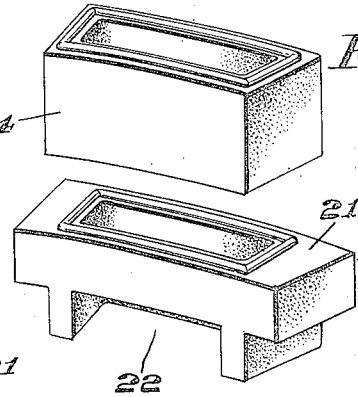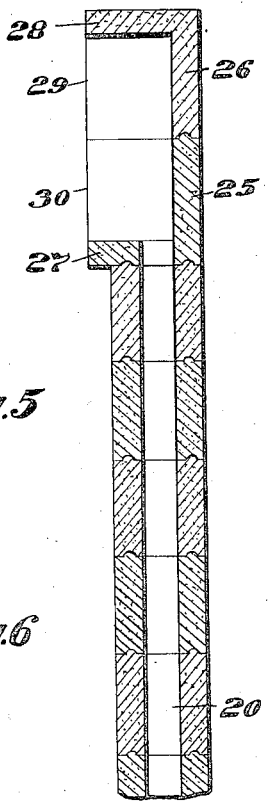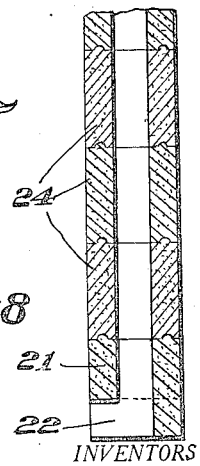

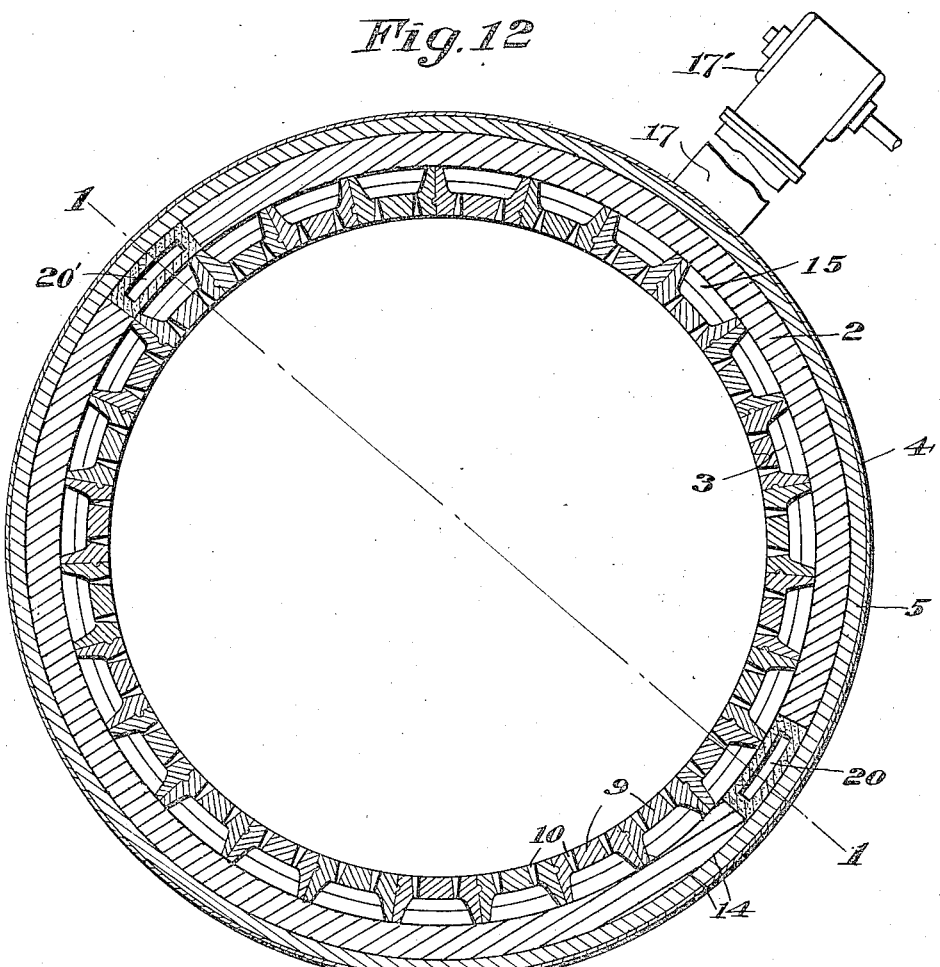
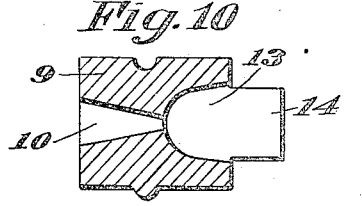
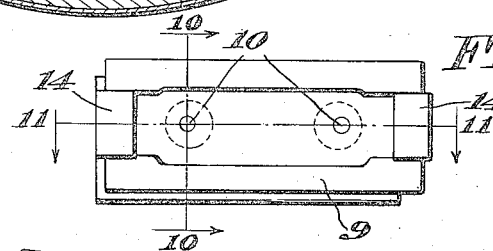
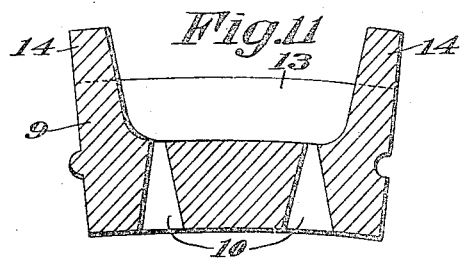

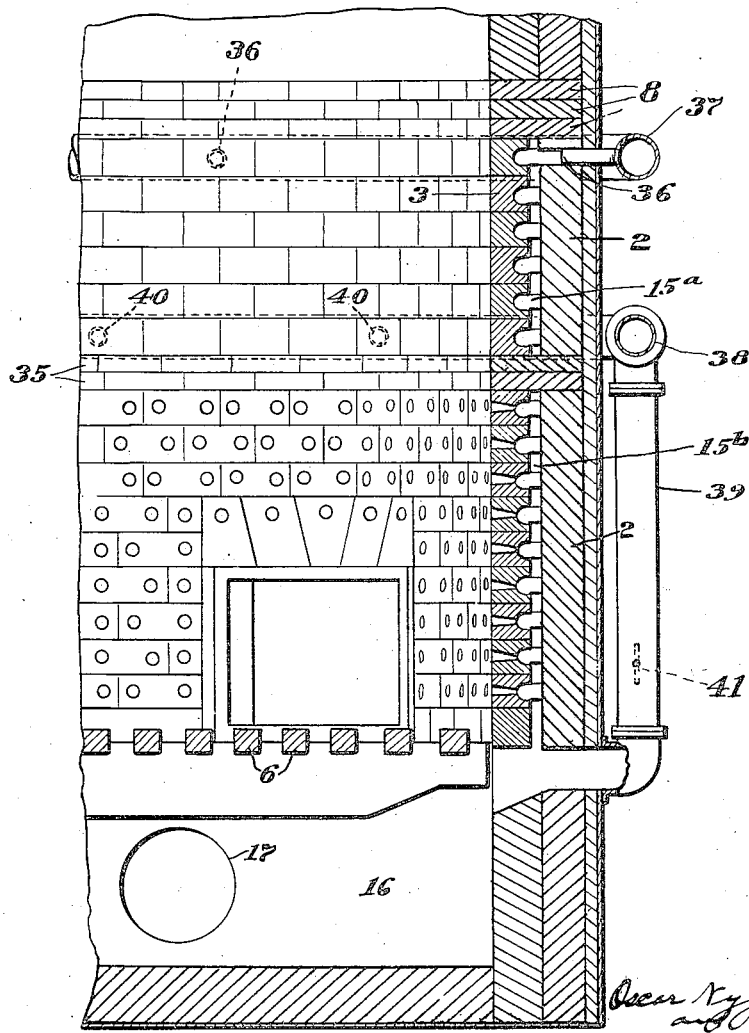

1,790,110

UNITED STATES PATENT OFFICE

OSCAR NYGAARD, OF SAUGUS, AND BENJAMIN H. SNOW, OF MELROSE, MASSACHUSETTS, ASSIGNORS TO BERNITZ FURNACE APPLIANCE COMPANY, OF BOSTON, MASSACHUSETTS, A CORPORATION OF MASSACHUSETTS

GAS GENERATOR

Application filed July 9, 1926. Serial No. 121,368.

This invention relates to apparatus for generating combustible gases such as water gas, producer gas, and the like, such apparatus usually being referred to as water gas generators or gas producers. The invention is especially concerned with generators designed for the manufacture of water gas but some features of the invention are also applicable to apparatus used in the manufacture of other combustible gases.

In such apparatus the temperatures in the fuel bed become so high at times that the surfaces of the bricks or blocks which make up the lining of the gas generating chamber become soft and plastic, thus causing the slag and ash to adhere or fuse to said surfaces. As this action continues, the fused mass grows, and after a comparatively short period of operation it assumes such proportions that the cross-sectional area of the generator is materially decreased, thus reducing the gas making capacity of the generator and making its operation more sluggish, difficult and inefficient. It is therefore necessary to remove this fused mass of slag and clinkers from time to time and in breaking off this accumulation pieces of the lining are also broken off. Considerable time is consumed in dislodging the clinkers from the lining, and it is impossible to do this work without first temporarily shutting down the generator so that the service of this unit is interrupted. As these cleaning operations are repeated, the lining soon becomes worn away until the point is reached where it must be renewed. A complete shut down of the generator then is necessary. Such renewal, therefore, is very expensive both in labor and materials and also in the loss of service of the generator.

The present invention deals with the problems presented by these conditions, and it aims especially to improve the wall construction of generators of the type mentioned with a view to increasing their life, protecting the walls from the destructive action above described, and reducing the maintenance expense of such generators. A further important object of this invention is to facilitate the gas making operation and to increase the efficiency of generators of this type.

The nature of the invention will be readily understood from the following description when read in connection with the accompanying drawings, and the novel features will be particularly pointed out in the appended claims.

In the drawings,

Figure 1 is a vertical, cross-sectional view of a part of a gas generating apparatus constructed in accordance with this invention;

Fig. 2 is a vertical, cross-sectional view of a modified form of generator wall;

Figs. 3 and 4 are front and vertical cross-sectional views, respectively, of an air duct or conduit built into the wall of the generator shown in Fig. 1;

Figs. 5, 6, 7 and 8 are perspective views of special bricks or blocks used in the construction of the conduit shown in Figs. 3 and 4;

Fig. 9 is a rear view of a brick or block used in the lining of the generator shown in Fig. 1;

Fig. 10 is a vertical, cross-sectional view on the line 10—10, Fig. 9;

Fig. 11 is a horizontal cross-sectional view on the line 11—11, Fig. 9;

Fig. 12 is a horizontal cross-sectional view substantially on the line 12—12, Fig. 1; and Fig. 13 is a view, partly in side elevation and partly in vertical cross-section, showing another generator wall embodying features of this invention.

Referring first to Figs. 1 and 12, the gas generator there shown includes a generator wall which surrounds the gas generating chamber and consists of a rear section 2 and a front section or lining 3. This wall is enclosed in a metal shell 4 and a packing 5 of heat insulating material, such as asbestos, magnesia, or the like, is interposed between the outer wall section 2 and the shell 4. Usually these generators are approximately circular in horizontal cross-section. The fuel bed occupies part of the gas generating chamber and rests on the grate 6 and is surrounded and laterally supported by the generator wall.

The lining for the wall shown is divided into upper and lower sections, the lower section extending from the neighborhood of the grate bars 6 to the line 7, Fig. 1, and the upper section extending from the line 7 to the lower course of tie bricks 8. Both sections of the lining are made of hollow bricks, and the cavities in the bricks communicate with each other so that a continuous space 15 is provided between the rear wall section 2 and the lining. The lining separates this space from the gas generating chamber. During a considerable part of the time that the generator is in operation, this space is occupied by air, and accordingly it will be referred to herein as an "air space", it being understood, however, that at some periods of operation of the generator the space is occupied by steam and at other periods by gas. The lower section of the lining is composed chiefly of bricks 9 having holes or apertures 10 therethrough to admit air from said air space into the fuel bed. The upper section is made up chiefly of bricks 12 of the same general shape and dimensions as the bricks 9 but which are imperforate, or in other words, are not provided with the apertures 10. These bricks usually are referred to as blank bricks to distinguish them from the apertured bricks 9.

Figs. 9, 10 and 11 show very clearly the construction of the bricks 9, and it will be observed from an inspection of these figures that each brick has a relatively deep cavity 13 in the rear face thereof, and that it is also provided at each end with a spacing lug 14. These lugs bear against the rear wall section 2, as best shown in Fig. 12, and space the body portions of the bricks 9 from the rear wall, thus providing the air space 15 above referred to between the rear wall section 2 and the lining 3. The blocks or bricks 12 are exactly like the bricks 9 except that they do not have the apertures 10. Both styles of bricks are made of some highly refractory material, silicon carbide or carborundum being preferred.

As shown in Fig. 1, the air space 15 between the front and rear wall sections extends continuously for the entire height of the hollow wall and opens into the ash pit 16 through a duct 23. During one period in the normal operation of the generator for the purpose of making water gas, air is admitted to the ash pit through a blast pipe, the end of which is indicated at 17, Fig. 1, the blast being created in any convenient manner as by a blower 17′, Fig. 12. Most of this air enters the fuel bed between the grate bars 6, but a substantial part of it passes up through the space 15 and enters the fuel bed through the apertures 10 in the lower section of the lining.

The air blast is of sufficient duration to bring the temperature in the fuel bed up to a point suitable for making gas, after which the air blast is discontinued and steam is admitted to the ash pit through the pipe 18, the steam passing through the fuel bed in a like manner to the air, entering partly through the grate and partly through the perforations 10 in the lining. Thus it will be seen that both air and steam in circulating around the blocks 9 and 12 before entering the fuel bed, keep the lining comparatively cool and at a temperature sufficiently low to prevent the adhesion of slag and ash to it.

In addition to this, the air so supplied is useful in promoting a uniform heating and partial combustion of the fuel. Also the steam entering the fuel bed through the apertures in the lining is divided into a multitude of fine streams which facilitate rapid and complete decomposition thereof, making it possible to obtain a richer and more valuable gas of the kind commonly called "blue water gas."

In most of these generators steam is also alternately admitted at the top and bottom of the generator, the steam flowing in at the top through the pipe 18′. As the steam flows down through the fuel bed it is broken down by the incandescent carbon, and by reaction with the carbon forms blue water gas consisting largely of hydrogen and carbon monoxide. The gaseous mixture flows into the ash pit partly through the apertures 10 and the space 15 and partly through the grate. This water gas leaves the generator through the conduit or pipe 19. During the "up run" the water gas is discharged through a conduit 19′, Fig. 1. The multitude of apertures in the lining again are of great value in that they afford the gas a free outlet, which is especially beneficial at such time when the openings between the grate bars have become more or less clogged with clinkers. It has been found possible to operate a generator of this construction at much longer intervals between cleaning periods, thus lengthening the actual operating period of the generator per day and effecting a substantial saving in time and labor.

The upper surface of the fuel bed usually is somewhere in the general level of the upper part of the hollow wall section, as, for example, at the line indicated at f, Fig. 1. It is evident that if the apertured section of the lining were continued to a point too near the top of the fuel bed the draft through the body of fuel would be reduced or short circuited, thus interfering with the proper distillation and combustion of the fuel. It has therefore been necessary to confine the apertured blocks to the lower part of the lining. If the upper part of the wall is made solid the slag and clinker will adhere to it, with the results above described. Accordingly, in the generator shown in Fig. 1 the upper section of the lining is made of hollow blocks or bricks 12 having a blank or imperforate face or front wall. These blank blocks are constructed as shown in the drawings to facilitate the cooling thereof and they may be made up in many different shapes and designs, all capable of producing substantially the same results.

By extending the space 15 up behind the blank blocks 12, a certain amount of cooling effect is obtained which eliminates the clinker adhesion. While this imperforate lining practically prevents any discharge of air from the space 15 into the gas generating chamber, it has been found by experience that a limited circulation occurs in this space apparently due to the surging action of the air and steam during the normal operation of the generator. These blank blocks or bricks are, however, not cooled as much as the perforated blocks. Consequently, their temperature is higher with the result that their life or period of usefulness is more limited. In order to overcome this difficulty we have devised a number of ways of creating a more positive circulation behind the unperforated section of the lining.

This may be done in some cases simply by venting the air space in the upper wall section. If the blank wall section is not too high, a satisfactory venting may be produced by including a few of the perforated bricks 9 in one of the upper courses of blank bricks in the blank brick section, and such a construction is indicated in Fig. 2 where an occasional apertured brick 9 is inserted in the uppermost course of blank bricks 12. In most installations, however, we prefer the arrangement shown in Fig. 1 in which a very few apertured bricks 9' are included in an intermediate course in the upper section of the lining, and air and steam are conducted from the ash pit 16 to the upper part of this section through conduits or ducts 20—20' which are built into the rear section 2 of the wall.

Referring to Figs. 1 and 3 to 8, inclusive, it will be observed that this conduit or duct is made of specially constructed hollow bricks, the lowermost brick 21 having an opening 22 at the bottom and at the left-hand side (Figs. 1 and 4) thereof to communicate with the air opening 23 formed in the wall of the ash pit. Immediately above this brick is a series of hollow bricks 24 arranged one on the other and forming a continuous duct which leads past the perforated wall section and into the upper part of the air space behind the upper lining section. At the top of this duct or conduit 2, bricks 25 and 26 are placed one on the other, the lower brick 25 having a short horizontal flange 27 which abuts against the rear face of one or more of the blank bricks 12. The upper or cap brick 26 has a horizontal flange 28 which abuts against the rear face of the blank bricks 12. If the lugs 14 interfere with the flanges 27 or 28, such lugs may be broken off. These bricks 26 and 27 are open at the sides adjacent to the blank bricks. At one end they have faces 29 and 30, Figs. 4, 5 and 6, which abut against the blank bricks, but at their opposite end they are cut away as indicated at 31 and 32, Figs. 5 and 6, so that air or steam flowing upwardly through the right-hand conduit 20, Fig. 1, will be directed toward the left and backwardly in a horizontal direction through the notches 31 and 32, Figs. 5 and 6, and given an initial impulse in a circumferential direction through the upper part of the space behind the blank bricks 12. The upper bricks 27' and 28' of the conduit 20' at the left-hand side of the gas generating chamber, Fig. 1, are oppositely arranged. That is, the notches 31' and 32' open oppositely to the notches 31 and 32 so that the initial direction given to the air discharged from the upper end of this conduit will also be in the same circumferential direction as that in the opposite side of the generator wall.

It will thus be seen that air or steam discharged into the ash pit through the air pipe 17 and steam pipe 18 will be divided, part of it flowing directly into the fuel bed through the grate bars 6, part flowing through the space 15 behind the lining and entering the fuel bed through the apertures 10, while still another part of this air or steam flows through the ducts or conduits 20 and 20' to the upper part of the blank wall section where it is discharged into the upper part of the air space 15. This air or steam circulates through the latter space and gradually descends therethrough, finding an outlet into the fuel bed through the apertures 10 of the bricks 9', Fig. 1, in the intermediate course of bricks. This brick course is located considerably below the top of the fuel bed, and only a relatively small or inconsiderable volume of air or steam can escape through the apertures in this course, so that an effective flow of air or steam is maintained through the blank wall section without short circuiting the draft through the fuel bed, or interfering in the slightest degree with the proper operation of the generator. Some of the air or steam conveyed through the ducts 20 and 21 may find its way down past the bricks 9' and be discharged into the generator through the apertures in the lower section of the lining, or, some of the air or steam may travel up beyond the lower section and be discharged through the apertures in the bricks 9'. The exact distribution of air or steam is rather difficult to determine, but a definite flow is maintained through the space behind the blank wall section.

Experience has demonstrated that this generator wall construction will outlast an ordinary wall several times and that the expense for maintenance and repair are greatly reduced. This construction also is of advantage in promoting the uniform distribution of the air and steam through the fuel bed, and thus facilitates the gas making operation in addition to protecting the generator wall.

At the upper end of the hollow wall we prefer to use several courses of tie bricks 8 which bridge both the rear wall section 2 and the lining 3. Preferably, also, the construction is such that the greater part of the weight of the dome of the generator is supported on the outer wall section 2, so that when it becomes necessary to replace the lining 3, it is unnecessary to remove any of the tie bricks or any of the wall above them.

Under some conditions it may be desirable to control the circulation in the upper section of the hollow wall more definitely than in the constructions above described, or to use the air space in the upper section of the wall to preheat air which is used to promote combustion or for some other purpose. This can be conveniently done by separating the air spaces in the upper and lower wall sections. Fig. 13 shows such an arrangement in which the bricks 35 separate the air space 15a in the upper wall section from the air space 15b in the lower wall section, the construction of the wall in other respects being substantially like that above described. This wall, however, includes no perforated bricks in the upper section. Air is admitted to the upper part of the space 15a through inlet ducts or openings 36 communicating with a header 37 which is connected to the main fan or blower that forces air through the blast pipe which opens into the ash pit at 17. A damper should be included in the blast pipe, and the pipe leading from the header 37 to the blast pipe should open into it behind the damper, that is, between the damper and the fan, so that a higher pressure can be delivered to the header 37 than to the ash pit 16. The air so admitted to the space 15a flows downwardly through this space and out through outlet openings 40 into another header 38 which is connected by a pipe 39 to the ash pit 16. With this arrangement a positive flow of air is maintained through the air space in the upper wall section, this flow being independent of that in the space 15b in the lower wall section.

While we have herein shown and described typical generator constructions embodying our invention, it will be evident that the invention may be embodied in many other forms without departing from the spirit or scope thereof. In fact, the details of construction in any individual installation necessarily will vary somewhat with the nature of that installation and the conditions peculiar to it.

Having thus described our invention, what we desire to claim as new is:

1. In a combustible gas generator, a wall surrounding a gas generating chamber and serving to laterally support a fuel bed, said wall including a hollow section apertured at frequent intervals to admit air from the space therein to said fuel bed and also including another hollow section of considerable height immediately above the first section, and means for causing a positive flow of air through said upper section independently of the flow of air from said lower section into said chamber.

2. In a combustible gas generator, a hollow wall for surrounding a gas generating chamber and serving to laterally support a fuel bed, said wall consisting of a lower section and an upper section, the lower section being apertured at frequent intervals to discharge air from the space therein into the fuel bed, while the upper section is adapted to prevent any considerable discharge of air from the space therein into the generating chamber, and means for venting the space in said upper section independently of the flow of air from said lower section into said chamber.

3. In a combustible gas generator, a hollow wall for surrounding a gas generating chamber and serving to laterally support a fuel bed, said hollow wall including a lining which separates the air space in the wall from the gas generating chamber and comprises upper and lower sections, the lower section having a multiplicity of apertures therethrough to admit air from said air space into the fuel bed, said upper section being imperforate for the greater part of its area but having apertures serving to vent the air space in the upper section, independently of the flow of air from said lower section into said fuel bed.

4. In a combustible gas generator having an ash pit and means for conducting air into said ash pit, a wall for surrounding a gas generating chamber and serving to laterally support a fuel bed, said wall including a hollow section apertured at frequent intervals to admit air from the space therein to said fuel bed and also including another hollow section of considerable height immediately above the first section, and a separate air conduit connecting the air space in said upper section with the ash pit.

5. In a combustible gas generator having an air inlet and top and bottom steam inlets, a hollow wall for surrounding a gas generating chamber and serving to laterally support a fuel bed, said hollow wall including a lining which separates the air space in the wall from the gas generating chamber and comprises upper and lower sections, the lower section of the lining having a multiplicity of apertures therethrough to admit air from said air space into the fuel bed, said upper section of the lining being imperforate for at least the greater part of its area, and a separate air conduit in said wall arranged to conduct air past said lower section to said upper section.

6. In a combustible gas generator, a hollow wall for surrounding a gas generating chamber and serving to laterally support a fuel bed, said hollow wall including a lining which separates the air space in the wall from the gas generating chamber and comprises upper and lower sections, the lower section including a multiplicity of apertured bricks to admit air from said space into the fuel bed, the upper section being made chiefly of imperforate bricks but having apertures at an intermediate level to vent the air space in the upper section, and an air duct in said wall for discharging air into said upper section above said level independently of the general flow of air through said lower section.

7. In a combustible gas generator having top and bottom steam inlets, an ash pit and an air inlet thereto, a hollow wall for surrounding a gas generating chamber and serving to laterally support a fuel bed, said hollow wall including a lining which separates the air space in the wall from the gas generating chamber and comprises upper and lower sections, the lower section having a multiplicity of apertures therethrough to admit air from said air space into the fuel bed, said upper section being imperforate for the greater part of its area but having a very few apertures serving to vent the air space in the upper section, the air space in said lower section opening into the ash pit, and an air duct in said wall for conducting air from said ash pit past said lower section to the upper section independently of the general flow of air through said lower section.

8. In a combustible gas generator, the combination of a grate, a wall of approximately circular form for laterally supporting a fuel bed on said grate and surrounding a gas generating chamber, said wall comprising an outer section and a lining, said lining being divided into upper and lower sections, the lower section consisting chiefly of hollow bricks apertured to admit air from the spaces therein to the gas generating chamber, said spaces cooperating to form an air space in said wall communicating with the air space below the grate, the upper section of said lining consisting chiefly of blank hollow bricks cooperating to form an air space in the upper part of the wall, and means separate from the sections for causing air to flow through said air spaces behind both said upper and lower lining sections.

9. In a combustible gas generator, the combination of a grate, a wall of approximately circular form for laterally supporting a fuel bed on said grate and surrounding a gas generating chamber, said wall comprising an outer section and a lining, said lining being divided into upper and lower sections, the lower section consisting chiefly of hollow bricks apertured to admit air from the spaces therein to the gas generating chamber, said spaces cooperating to form an air space in said wall communicating with the air space below the grate, the upper section of said lining consisting chiefly of blank hollow bricks cooperating to form an air space in the upper part of the wall, and a separate air duct built in said wall and connecting the air space behind said upper section with the air space below said grate.

10. In a combustible gas generator, a wall for surrounding a gas generating chamber and laterally supporting a fuel bed, said wall including a hollow section apertured at frequent intervals to admit air from the space therein to said fuel bed and also including another hollow section of considerable height located immediately above the first section and adapted to prevent any considerable escape of air from the space therein into the gas generating chamber, the spaces in said sections being separated from each other, and means for causing a positive flow of air through both of said sections independently of each other.

11. In a combustible gas generator, a hollow wall surrounding a gas generating chamber and serving to laterally support a fuel bed, said hollow wall including a lining which separates the air space in the wall from said chamber and comprises upper and lower sections, the lower section having a multiplicity of apertures therethrough to admit air from said air space into the fuel bed, said upper section being imperforate for the greater part of its area, and means for conducting air into the upper part of the space in said upper section, said upper section having venting perforations in the lower part thereof.

In testimony whereof we have signed our names to this specification.

OSCAR NYGAARD.
BENJAMIN H. SNOW.